United States Patent
Park et al.

(10) Patent No.: US 8,699,804 B2
(45) Date of Patent: Apr. 15, 2014

(54) LOSSLESS IMAGE COMPRESSION AND DECOMPRESSION METHOD FOR HIGH DEFINITION IMAGE AND ELECTRONIC DEVICE USING THE SAME

(75) Inventors: Ji Ho Park, Seoul (KR); Byeong Ho Choi, Yongin-si (KR); Je Woo Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 253 days.

(21) Appl. No.: 13/089,758

(22) Filed: Apr. 19, 2011

(65) Prior Publication Data

US 2012/0195511 A1  Aug. 2, 2012

(30) Foreign Application Priority Data

Jan. 31, 2011  (KR) .................. 10-2011-0009678

(51) Int. Cl.
 *G06K 9/36* (2006.01)
(52) U.S. Cl.
 USPC ............ 382/233; 382/238; 382/236; 382/239; 382/166; 375/240.12; 375/E07.243
(58) Field of Classification Search
 USPC ......... 382/238, 236, 247, 233, 234, 240, 251, 382/224, 162, 239; 375/240.12, E07.243, 375/240.16, 240.03, E07.027, E07.245, 375/240.27, 240.24
 See application file for complete search history.

(56) References Cited

U.S. PATENT DOCUMENTS

| | | | | |
|---|---|---|---|---|
| 5,764,374 A * | 6/1998 | Seroussi et al. | ................ | 382/244 |
| 5,912,708 A * | 6/1999 | Kondo et al. | ................ | 348/415.1 |
| 6,167,160 A * | 12/2000 | Osawa | ................ | 382/247 |
| 7,199,733 B2 * | 4/2007 | Chi et al. | ................ | 341/67 |
| 7,266,247 B2 * | 9/2007 | Kim et al. | ................ | 382/236 |
| 8,326,063 B2 * | 12/2012 | Boon et al. | ................ | 382/238 |
| 8,451,893 B2 * | 5/2013 | Cho et al. | ................ | 375/240.12 |
| 2004/0062445 A1 * | 4/2004 | Kim et al. | ................ | 382/238 |
| 2006/0097897 A1 * | 5/2006 | Chi et al. | ................ | 341/67 |
| 2007/0064795 A1 * | 3/2007 | Cho et al. | ................ | 375/240.03 |
| 2009/0116760 A1 * | 5/2009 | Boon et al. | ................ | 382/238 |
| 2009/0190844 A1 * | 7/2009 | Park et al. | ................ | 382/233 |
| 2009/0232206 A1 * | 9/2009 | Boon et al. | ................ | 375/240.12 |
| 2009/0232208 A1 * | 9/2009 | Lee et al. | ................ | 375/240.12 |
| 2011/0176608 A1 * | 7/2011 | Kim et al. | ................ | 375/240.12 |
| 2011/0249738 A1 * | 10/2011 | Suzuki et al. | ................ | 375/240.12 |

FOREIGN PATENT DOCUMENTS

JP          09146494 A  *  6/1997
WO   WO 2010038587 A1 *  4/2010   ............... H04N 7/26

* cited by examiner

*Primary Examiner* — Mekonen Bekele
(74) *Attorney, Agent, or Firm* — Sughrue Mion, PLLC (57) ABSTRACT

A lossless image compression method for a high definition image is provided. The image compression method generates a minimum value of values produced by subtracting a current virtual pixel value from an average of neighbor pixels designated by a plurality of directions, as the prediction value of a current pixel. Thus, the image compression more efficient than the current JPEG-LS can be achieved.

12 Claims, 10 Drawing Sheets

| INPUT RESIDUAL COMPONENT = {0, 1, 2, 2, 3, 3, 3, 4} | | |
|---|---|---|
| INITIALIZATION | ENCODER MAP<br>DECODER MAP<br>FREQUENCY | {0, 1, 2, 3, 4}<br>{0, 1, 2, 3, 4}<br>{0, 0, 0, 0, 0} |
| 0 INPUT | ENCODER MAP<br>DECODER MAP<br>FREQUENCY | {0, 1, 2, 3, 4}<br>{0, 1, 2, 3, 4}<br>{1, 0, 0, 0, 0} |
| 1 INPUT | ENCODER MAP<br>DECODER MAP<br>FREQUENCY | {0, 1, 2, 3, 4}<br>{0, 1, 2, 3, 4}<br>{1, 1, 0, 0, 0} |
| 2 INPUT | ENCODER MAP<br>DECODER MAP<br>FREQUENCY | {0, 1, 2, 3, 4}<br>{0, 1, 2, 3, 4}<br>{1, 1, 1, 0, 0} |
| 2 INPUT | ENCODER MAP<br>DECODER MAP<br>FREQUENCY | {1, 2, 0, 3, 4}<br>{2, 0, 1, 3, 4}<br>{1, 1, 2, 0, 0} |
| 3 INPUT | ENCODER MAP<br>DECODER MAP<br>FREQUENCY | {1, 2, 0, 3, 4}<br>{2, 0, 1, 3, 4}<br>{1, 1, 2, 1, 0} |
| 3 INPUT | ENCODER MAP<br>DECODER MAP<br>FREQUENCY | {2, 3, 0, 1, 4}<br>{2, 3, 0, 1, 4}<br>{1, 1, 2, 2, 0} |
| 3 INPUT | ENCODER MAP<br>DECODER MAP<br>FREQUENCY | {2, 3, 1, 0, 4}<br>{3, 2, 0, 1, 4}<br>{1, 1, 2, 3, 0} |
| 4 INPUT | ENCODER MAP<br>DECODER MAP<br>FREQUENCY | {2, 3, 1, 0, 4}<br>{3, 2, 0, 1, 4}<br>{1, 1, 2, 3, 1} |
| ... | ... | ... |

LOSSLESS IMAGE COMPRESSION AND DECOMPRESSION METHOD FOR HIGH DEFINITION IMAGE AND ELECTRONIC DEVICE USING THE SAME

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 31, 2011, and assigned Serial No. 10-2011-0009678, the entire disclosure of which is hereby incorporated by reference.

TECHNICAL FIELD OF THE INVENTION

The present invention relates generally to an image compression method. More particularly, the present invention relates to a lossless image compression method for a high definition image.

BACKGROUND OF THE INVENTION

A lossless compressions scheme most widely used in recent is JPEG-LS. However, the JPEG-LS is selected and adopted by considering a processing speed, not considering a maximum compression ratio.

The JPEG-LS standard is defined in 2000. At that time, the JPEG-LS technique is efficient in view of the processing speed of H/W. These days, the speed of the H/W is increased greatly and an image used is changed to a high-quality high-definition image. Accordingly, conventional algorithms are not efficient any more.

Hence, an appropriate scheme to design the H/W with the higher compression ratio was developed by researching a method for the higher compression ratio and adding new algorithms for a lossless method applicable to a video and a still image and a compression method for a high definition image.

As a variety of multimedia devices are released, terminal with a higher resolution are demanded. To respond to this, MPEG which is ISO/IEC JTC 1 SC29WG11 and ITU-T SC16 Q9 VCEG are also working on standardization of an image compression scheme for supporting an ultra-high definition, such as High-performance Video Coding (HVC)/Next Generation Video Coding (NGVC) supporting 4K or more resolutions, so as to accommodate the demands in many industries. Future trends of the multimedia devices are to support the ultra-high definition.

However, the image compression standardized by the MPEG and the VCEG takes account of loss to compress a large amount of data, and suffers from considerable complexity. In this regard, a method for the lossless image compression with low complexity is needed.

SUMMARY OF THE INVENTION

To address the above-discussed deficiencies of the prior art, it is a primary aspect of the present invention to provide a lossless image compression method which is more efficient than a current JPEG-LS, and an electronic device using the method.

According to one aspect of the present invention, an image decompression method includes extracting residual information by decoding a bit stream of a compressed image; generating a prediction value for pixels of the image; and restoring the image using the residual information and the prediction value.

The generating of the prediction value may generate a minimum value of values produced by subtracting a current virtual pixel value from an average of neighbor pixels designated by a plurality of directions, as the prediction value of a current pixel.

The generating of the prediction value may use some of the directions based on the current virtual pixel value and neighbor pixel values.

The generating of the prediction value may generate the prediction value of the current pixel based on correlation values between neighbor pixels of the current pixel, and neighbor pixels of the neighbor pixels.

The generating of the prediction value may generate a pixel value of a neighbor pixel indicating a maximum value of the correlation values, as the prediction value of Ix.

The decoding may refer to a lookup table which is updated according to a frequency of a residual component.

When the frequency of the residual component is greater than a frequency of a previous residual component, the decoding may refer to a lookup table which is updated by exchanging assigned integers.

The bit stream of the compressed image may include bit streams containing data relating to segments in the image.

According to another aspect of the present invention, an image compression method includes determining prediction values for pixels of an input image; generating residual information for the pixels of the input image, based on the prediction values; and encoding the generated residual information.

The determining of the prediction values may determine a minimum value of values produced by subtracting a current virtual pixel value from an average of neighbor pixels designated by a plurality of directions, as the prediction value of a current pixel.

The determining of the prediction value may limit the directions based on the current virtual pixel value and neighbor pixel values.

The determining of the prediction value may determine the prediction value of the current pixel based on correlation values between neighbor pixels of the current pixel, and neighbor pixels of the neighbor pixels.

The determining of the prediction value may determine a pixel value of a neighbor pixel indicating a maximum value of the correlation values, as the prediction value of Ix.

The encoding may update an encoder map and a decoder map according to a frequency of a residual component.

When the frequency of the residual component is greater than a frequency of a previous residual component, the encoding may update an encoder map and a decoder map by exchanging assigned integers.

The image compression method may further include segmenting an input image to a plurality of subframes, wherein the determining of the prediction values, the generating of the residual information, and the encoding are performed on a subframe basis.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Certain exemplary embodiments of the present disclosure will now be described in greater detail with reference to the accompanying drawings.

1. Spatial Prediction Based on JPEG-LS

A spatial prediction base on JPEG-LS determines a prediction value for a pixel to currently encode, using correlation with neighbor pixel values.

Figure 1:
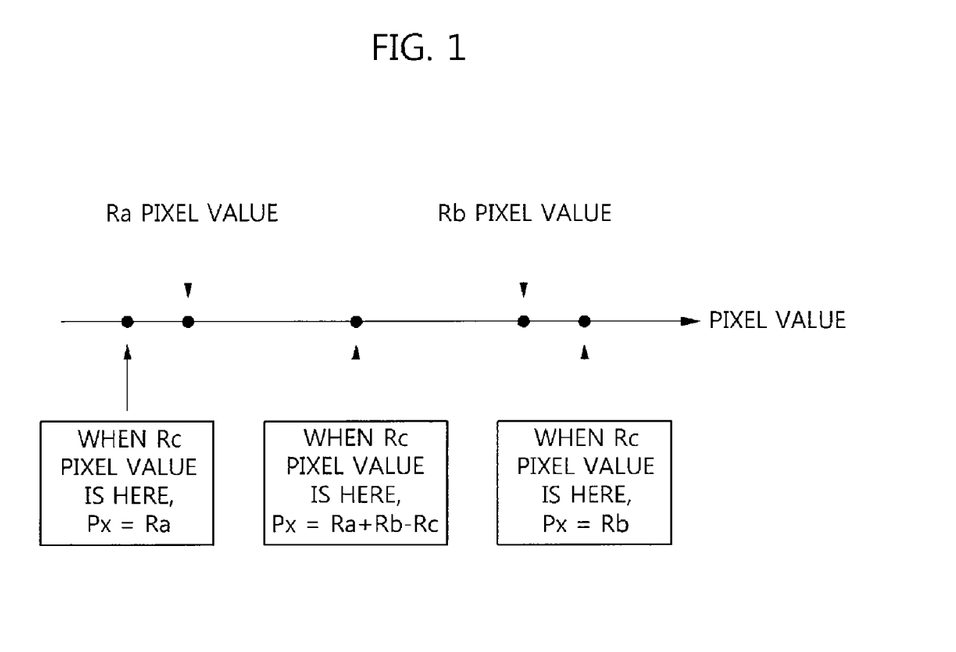
FIG. 1 illustrates spatial prediction based on JPEG-LS.

FIG. 1 illustrates the spatial prediction based on the JPEG-LS. As shown in FIG. 1, Ra (left pixel), Rb (upper pixel), and Rc (upper left pixel) pixel values of neighbor pixels of the pixel to currently encode are arranged along a straight line according their pixel value, their correlation is compared, and thus the prediction value is predicted.

More specifically, which one of the Ra pixel value and the Rb pixel the Rc pixel value is close to is compared and predicted. As shown in FIG. 1, 1) when the Rc pixel value is outside the Ra pixel value, a prediction value Px is determined to Ra,
2) when the Rc pixel value is outside the Rb pixel value, the prediction value Px is determined to Rb, and
3) when the Rc pixel value is between the Ra pixel value and the Rb pixel value, the prediction value Px is determined to Ra+Rb−Rc.

2. Directional Spatial Prediction

For the spatial prediction based on the JPEG-LS, it is assumed that the Rc pixel value and a current pixel value Ix, which are compared with each other, are considerably similar to each other. If the Re pixel value and the Ix pixel value are greatly different from each other as in the boundary of an object, this prediction cannot work well.

Thus, a lossless image compression method of the present invention uses a directional spatial prediction scheme which is different from the spatial prediction. Hereafter, the directional spatial prediction is elucidated.

For the directional spatial prediction, inter-plane prediction is performed first. The inter-plane prediction encodes a G value having the highest color similarity in the same manner as the conventional JPEG-LS, and encodes R and B using the encoded G value.

Figure 2:
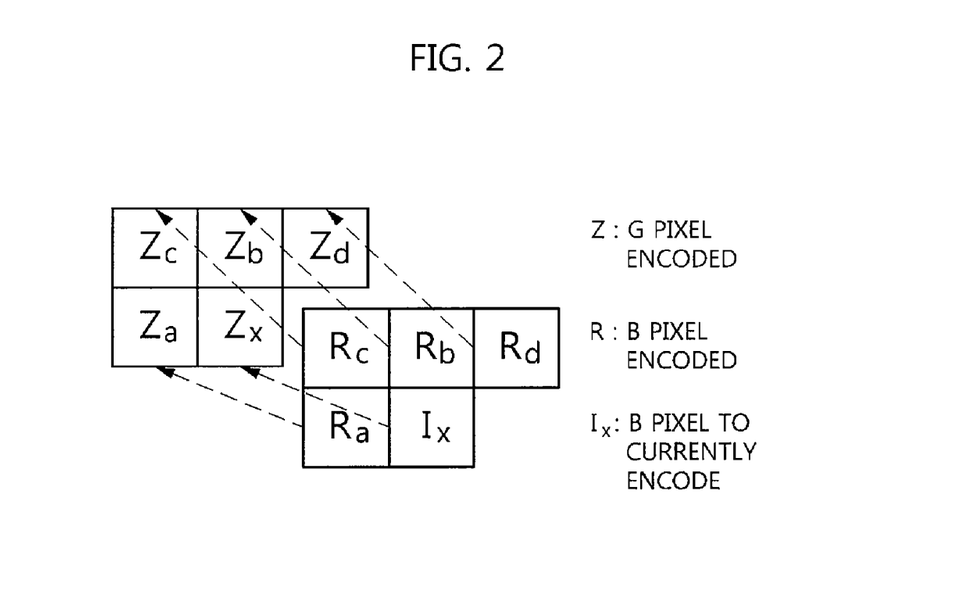
FIG. 2 illustrates inter-plane prediction.

In more detail, in the inter-plane prediction, the input signal is encoded in the order of G, B and R, and G is losslessly compressed in the same manner as the JPEG-LS. Next, the input signal B utilizes the G signal value at the same location as the encoded location, as a reference neighbor pixel as shown in FIG. 2.

A value generated by the inter-plane prediction is referred to as a Predicator X by Inter-plane prediction (Pix).

Figure 3:
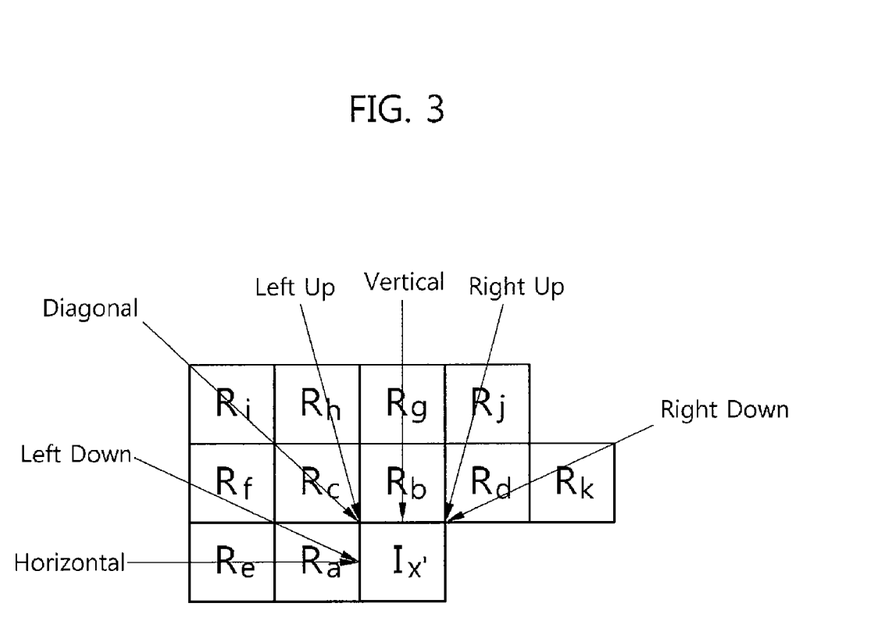
FIG. 3 illustrates directional spatial prediction.

Next, a prediction value is generated by setting Pix to Ix' which is the virtual Ix value and using neighbor pixels having the smallest residual component from each neighbor pixel as shown in FIG. 3. More specifically, the prediction value is determined as a minimum value of values produced by subtracting Ix' from the average of the neighbor pixels passed by the arrow with respect to seven directions. That is, 1) when the horizontal direction [(Re+Ra)/2−Ix'] is the minimum value, the prediction value is determined as (Re+Ra)/2−Ix',
2) when the left down direction [(Rf+Ra)/2−Ix'] is the minimum value, the prediction value is determined as (Rf+Ra)/2−Ix',
3) when the diagonal direction [(Ri+Rc)/2−Ix'] is the minimum value, the prediction value is determined as (Ri+Rc)/2−Ix',
4) when the left up direction [(Rh+Rc)/2−Ix'] is the minimum value, the prediction value is determined as (Rh+Rc)/2−Ix',
5) when the vertical direction [(Rg+Rb)/2−Ix'] is the minimum value, the prediction value is determined as (Rg+Rb)/2−Ix',
6) when the right up direction [(Rj+Rd)/2−Ix'] is the minimum value, the prediction value is determined as (Rj+Rd)/2−Ix', and
7) when the right down direction [(Rk+Rd)/2−Ix'] is the minimum value, the prediction value is determined as (Rk+Rd)/2−Ix'.

3. Limited Directional Spatial Prediction

When the prediction value is determined using the neighbor pixels passed by the arrow in the seven directions as shown in FIG. 3, much computation is required. To reduce the computation, the directionality can be limited.

Figure 4:
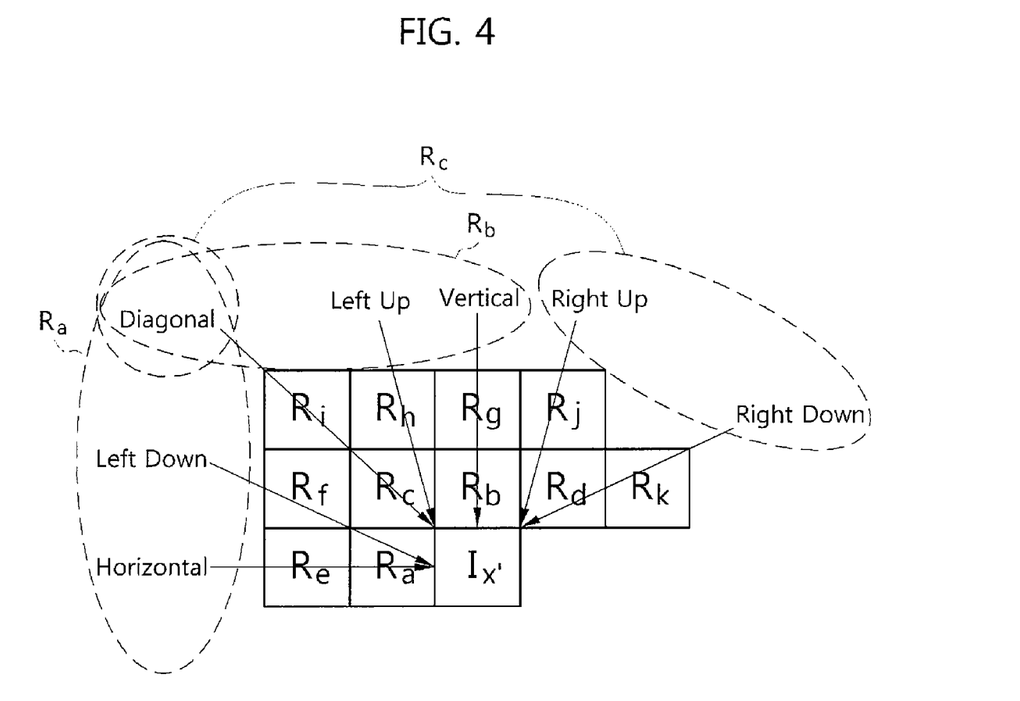
FIG. 4 illustrates limited directional spatial prediction.

In so doing, the directionality can be limited by determining which one of the Ra pixel value and the Rb pixel value Ix' is closer to. As shown in FIG. 4, 1) when Ix' is outside the Ra pixel value, only the horizontal direction, the left down direction, and the diagonal direction are considered,
2) when Ix' is outside the Rb pixel value, only the diagonal direction, the left up direction, and the vertical direction are considered, and
3) when Ix' is between the Ra pixel value and the Rb pixel value, only the diagonal direction, the right up direction, and the right down direction are considered.

When only the horizontal direction, the left down direction, and the diagonal direction are considered because Ix' is outside the Ra pixel value, the prediction value is determined to the minimum value of the values produced by subtracting Ix' from the average of the neighbor pixels passed by the arrow in those three directions. Thus, the computation can be received by half or more.

4. Self Correlation Spatial Prediction

The lossless image compression method of the present invention may use a self correlation spatial prediction scheme. The self correlation spatial prediction is applied to a G color space, and determines the prediction value based on correlation between the neighbor pixels of the current pixel and neighbor pixels of the neighbor pixels.

Figure 5:
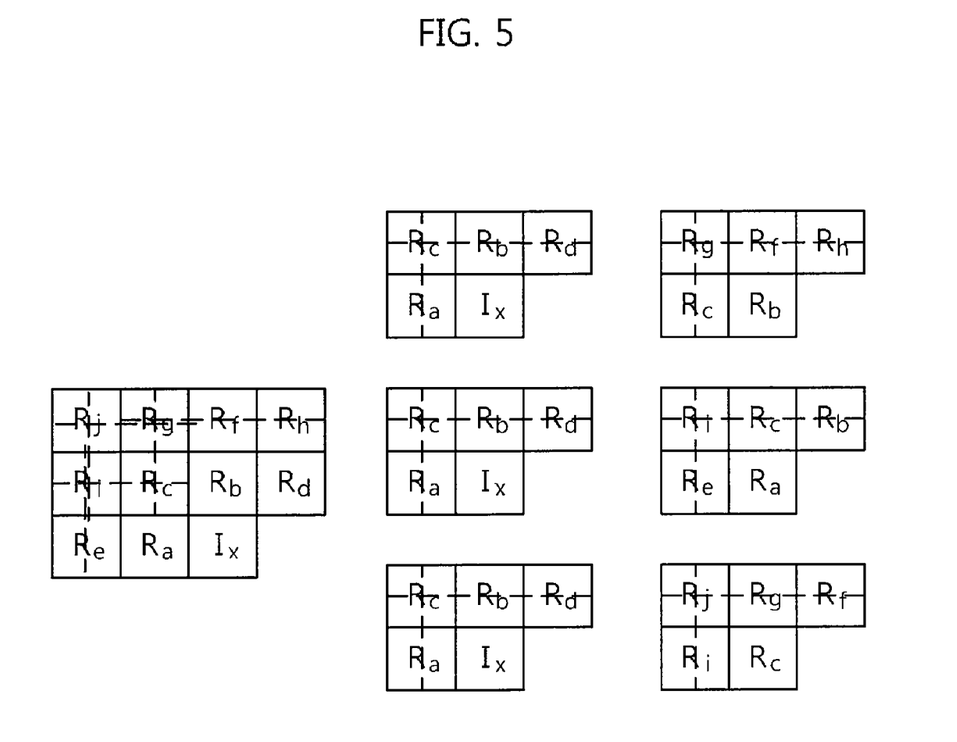
FIG. 5 illustrates self correlation spatial prediction.

In detail, as shown in FIG. 5, 1) the correlation value between the Ra, Rc, Rb and Rd neighbor pixels of Ix, and Rc, Rg, Rf and Rh neighbor pixels of the Rb, 2) the correlation value between the Ra, Rc, Rb and Rd neighbor pixels of Ix, and Re, Ri, Rc and Rb neighbor pixels of the Ra, and 3) the correlation value between the Ra, Rc, Rb and Rd neighbor pixels of Ix, and Ri, Rj, Rg and Rf neighbor pixels of the Rc are calculated.

Next, the neighbor pixel of Ix indicating the maximum value of the calculated correlation values is determined as the prediction value of Ix. More specifically, 1) when the correlation value between the neighbor pixels of Ix and the neighbor pixels of Ra is greatest, Ra is determined as the prediction value of Ix, 2) when the correlation value between the neighbor pixels of Ix and the neighbor pixels of Rb is greatest, Rb is determined as the prediction value of Ix, and 3) when the correlation value between the neighbor pixels of Ix and the neighbor pixels of Rc is greatest, Rc is determined as the prediction value of Ix.

Meanwhile, it is possible to add a weight factor varying depending on the correlation value to the prediction value of Ix.

5. Adaptive Variable Length Coding

The loss less image compression method of the present invention updates a lookup table (an encoder map and a decoder map) according to a frequency of a residual component. In detail, while the frequency of the residual component is checked continuously, when the frequency of the residual component to encode currently is greater than the frequency of the previous residual component, a shorter variable length coding is carried out by exchanging assigned integers.

Figure 6:
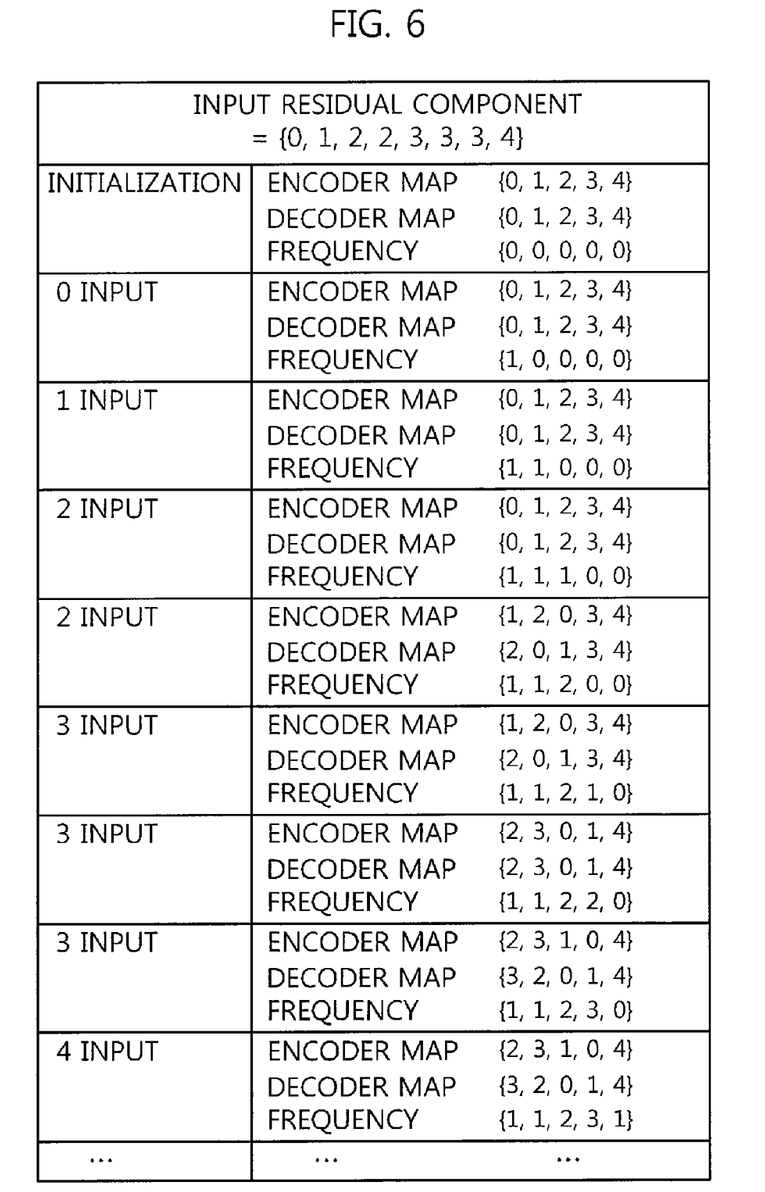
FIG. 6 illustrates an encoder map and a decoder map updated by checking a frequency of a residual component.

FIG. 6 depicts the updating of the encoder map and the decoder map by checking the frequency of the residual component when the residual component is input as {0, 1, 2, 2, 3, 3, 3, 4}.

After the encoder map and the decoder map are initialized, the frequency alone is counted until the residual component 0 is input, the residual component 1 is input, and the residual component 2 is input. The encoder map and the decoder map do not change as shown in FIG. 6.

Next, when one more residual component 2 is input, the frequency of the residual component 2 is greater than the frequency of the residual component 0 and the frequency of the residual component 1 and thus the encoder map and the decoder map are updated to assign 0 to the residual component 2.

Next, when the second residual component 3 is input, the frequency of the residual component 3 is greater than the frequency of the residual component 0 and the frequency of the residual component 1 and thus the encoder map and the decoder map are updated to assign 1 to the residual component 3.

Next, when the third residual component 3 is input, the frequency of the residual component 3 is greater than the frequencies of the residual component 0, the residual component 1, and the component residual 2 and thus the encoder map and the decoder map are updated to assign 0 to the residual component 3 and to assign 1 to the residual component 2.

In result, the input residual component {0, 1, 2, 2, 3, 3, 3, 4} is mapped to {0, 1, 2, 2, 3, 3, 1, 4}.

As such, the encoder map and the decoder map are continually updated as the frequency of the residual component is counted in real time.

However, when the residual component of the relatively low frequency appears a lot at the initial time, the residual component of the low frequency occupies the variable coding of the short length to thus increase the number of the map updating and the computation.

To address the shortcomings, the initial frequency of the residual component having the low frequency statistically/generally is set to low and the initial frequency of the residual component having the high frequency statistically/generally is set to high, rather than setting the initial frequency of every residual component to zero. Thus, the number of the map updating can be reduced at the initial stage.

At this time, $2^{max}$-ary initial frequencies are defined for four residual components of the smallest statistical/general frequency, and $2^{max-2}$-ary initial frequencies are defined for next four residual components of the second smallest statistical/general frequency. As such, the difference of 4 can be set between the initial frequencies.

In the mean time, the number of the map updating can be reduced by limiting the integer change of the residual component.

6. Prediction Based on the Previous Image

The directional spatial prediction, the limited directional spatial prediction, and the self correlation spatial prediction are to reduce signal information in the BR color space using the G color space signal among the GBR color space. Now, a method for reducing the G color space signal information is described in detail.

To reduce the information of the G color space, the previous image can be used as a reference pixel of the G color space or as a reference pixel for the inter-plane prediction.

Figure 7:
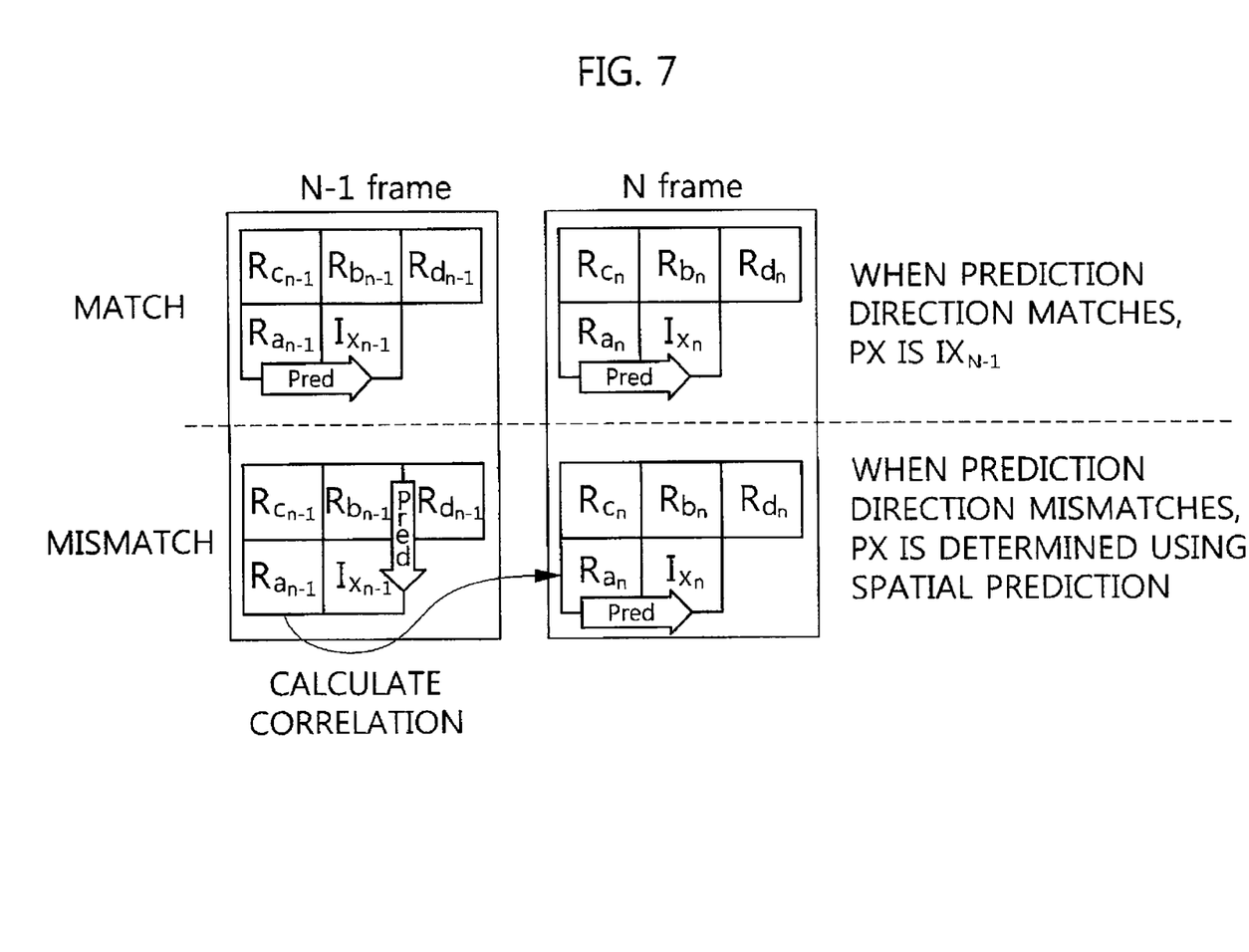
FIG. 7 illustrates prediction based on a previous image.

For doing so, it is necessary to record whether the previous image pixel is used, in a header. When the prediction direction in the previous image pixel matches the prediction direction in the current image pixel, the prediction value in the current image pixel is replaced by the pixel value of the previous image pixel as shown in FIG. 7.

By contrast, when the prediction direction in the previous image pixel is different from the prediction direction in the current image pixel, the prediction value of the current image pixel is determined using the spatial prediction based on JPEG-LS.

Meanwhile, when there is a considerable difference between the current image and the previous image and between the current image pixel and the previous image pixel at the same location, compensation for the displacement between the images is required.

Figure 8:
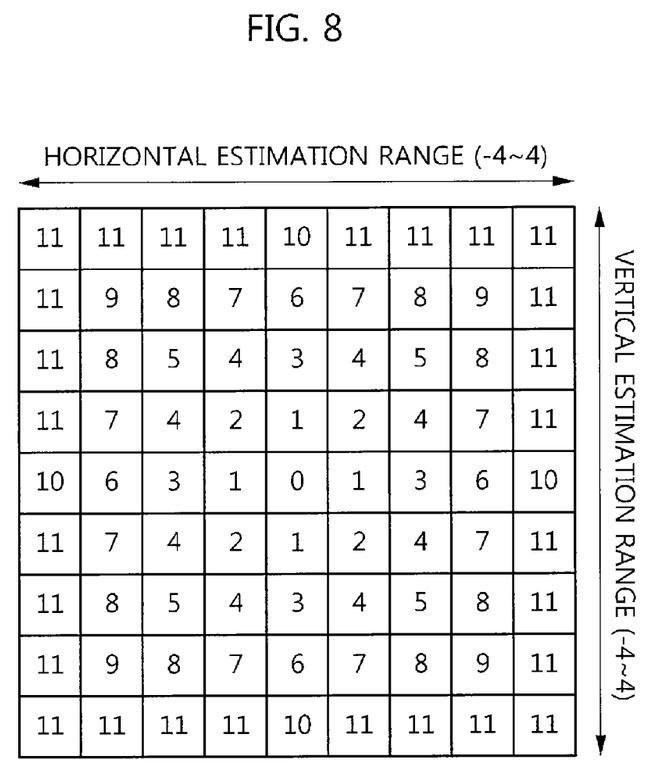
FIG. 8 illustrates a displacement estimation order.

For the compensation, each subframe holds one displacement information. To rapidly extract the displacement information, the displacement information can be extracted in order as shown in FIG. 8. When a Mean Absolute Difference (MAD) in the current extraction region is smaller than the next extraction region, the computation can be more simplified by not extracting the MAD value in the next region.

7. Subframe

The lossless image compression method of the present invention can perform parallel processing to enhance a processing speed. In detail, the input image is segmented to a plurality of subframes. The compressed bit streams are generated for the subframes using separate encoders for the respective subframes, and thus one united bit stream can be generated.

Figure 9:
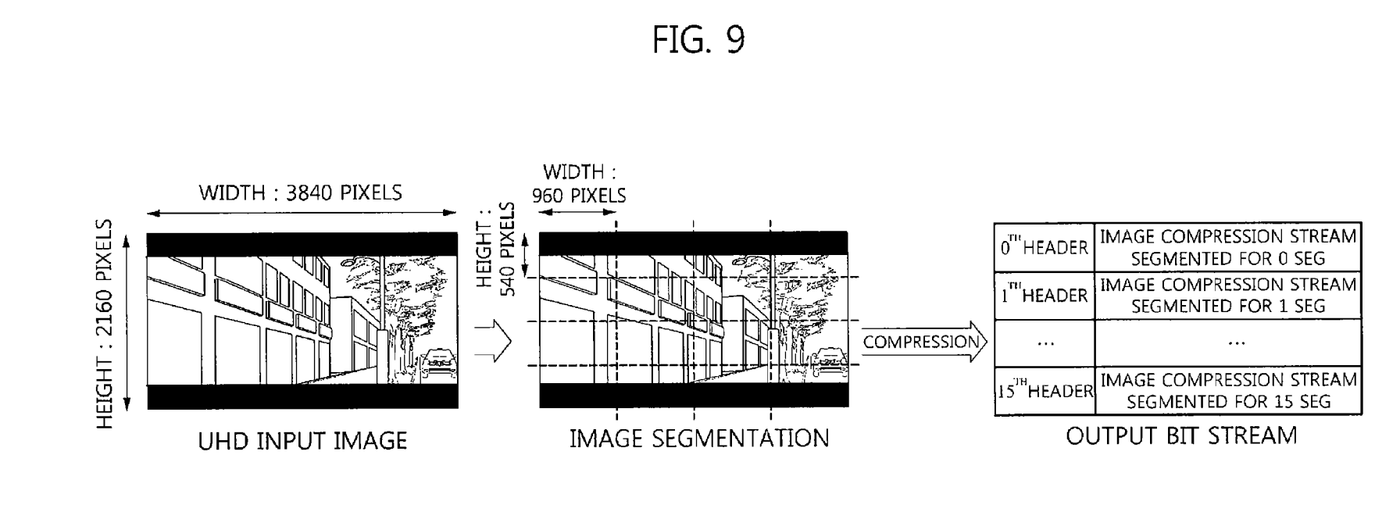
FIG. 9 illustrates an image segmentation method and a format of a final bit stream.

For doing so, segmentation information relating to the size of the input image is necessary, which is recorded in the header of the bit stream. The decoder can obtain the image segmentation information from the header. FIG. 9 depicts a format of the ultimate bit stream when the image is segmented to 4*4.

8. Compression/Decompression Method

Figure 10:
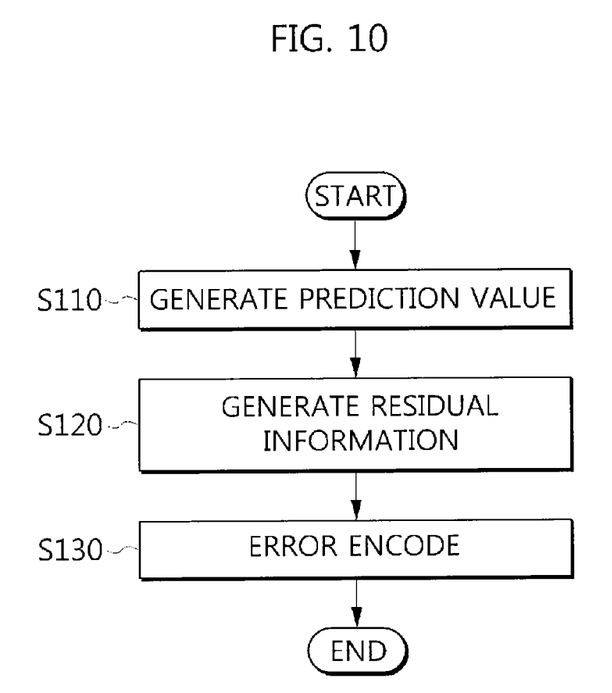
FIG. 10 illustrates an image compression encoding method.

FIG. 10 is a flowchart of an image compression method. As shown in FIG. 10, the image compression determines the prediction values for the pixels of the input image (S110), generates the residual information for the pixels of the input image based on the prediction values (S120), and error-encodes the generated residual information (S130).

S110 can apply the directional spatial prediction (section 2), the limited directional spatial prediction (sector 3), the self correlation spatial prediction (section 4), or the prediction based on the previous image (section 6).

S130 can apply the adaptive variable length coding (section 5).

Figure 11:
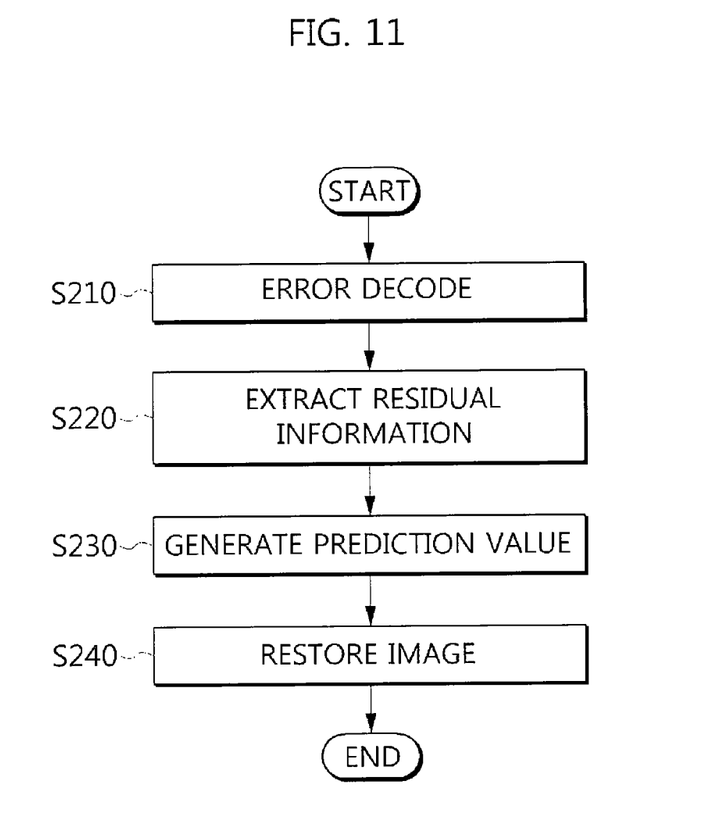
FIG. 11 illustrates an image compression decoding method.

FIG. 11 is a flowchart of an image decompression method. The image decompression extracts the residual information (S220) through the error decoding (S210), generates the prediction value (S230), and restores the image using the residual information and the prediction value (S240) as shown in FIG. 11.

S210 can use the decoder map generated in the adaptive variable length coding (section 5).

S230 can apply the directional spatial prediction (section 2), the limited directional spatial prediction (sector 3), the self correlation spatial prediction (section 4), or the prediction based on the previous image (section 6).

As set forth above, the image compression more efficient than the current JPEG-LS is achieved. In addition, the image segmentation and the parallel processing are possible, and the compression efficiency can be raised.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An image decompression method comprising:
   extracting residual information by decoding a bit stream of a compressed image;
   generating a prediction value of pixels of the image; and
   restoring an original image using the residual information and the prediction value,
   wherein the prediction value of a current pixel is a minimum value among values produced by subtracting a virtual pixel value of the current pixel from average values of neighbor pixels of the current pixel designated by a plurality of directions, and
   wherein the virtual pixel value of the current pixel is different from a pixel value of the current pixel.

2. The image decompression method of claim 1, wherein, in the generating the prediction value, only some of the directions are used based on the virtual pixel value of the current pixel and neighbor pixel values of the current pixel.

3. An image decompression method comprising:
   extracting residual information by decoding a bit stream of a compressed image;
   generating a prediction value of pixels of the image; and
   restoring the image using the residual information and the prediction value,
   wherein the decoding comprising referring to a lookup table which is updated according to a frequency of a residual component.

4. The image decompression method of claim 3, wherein, when the frequency of the residual component is greater than a frequency of a previous residual component, the lookup table which is updated by exchanging assigned integers is referred to.

5. The image decompression method of claim 1, wherein the bit stream of the compressed image comprises bit streams containing data relating to segments in the image.

6. An image compression method comprising:
   determining prediction values for pixels of an input image;
   generating residual information of the pixels of the input image, based on the prediction values; and
   encoding the generated residual information,
   wherein a prediction value of a current pixel, among the prediction values, is a minimum value among values produced by subtracting a virtual pixel value of the current pixel from average values of neighbor pixels of the current pixel designated by a plurality of directions, and
   wherein the virtual pixel value of the current pixel is different from a pixel value of the current pixel.

7. The image compression method of claim 6, wherein, in the determining the prediction value, only some of the directions are used based on the virtual pixel value of the current pixel and neighbor pixel values of the current pixel.

8. An image compression method comprising:
   determining prediction values for pixels of an input image;
   generating residual information of the pixels of the input image, based on the prediction values; and
   encoding the generated residual information,
   wherein the encoding updates an encoder map and a decoder map according to a frequency of a residual component.

9. The image compression method of claim 8, wherein, when the frequency of the residual component is greater than a frequency of a previous residual component, the encoding updates an encoder map and a decoder map by exchanging assigned integers.

10. The image compression method of claim 6, further comprising: segmenting an input image to a plurality of subframes,
    wherein the determining of the prediction values, the generating of the residual information, and the encoding are performed on a subframe basis.

11. The image decompression method of claim 1, wherein the virtual pixel value of the current pixel is obtained such that at least one of red (R) and blue (B) values of the current pixel is predicted using a prediction value of a green (G) value of the current pixel.

12. The image compression method of claim 6, wherein the virtual pixel value of the current pixel is obtained such that at least one of red (R) and blue (B) values of the current pixel is predicted using a prediction value of a green (G) value of the current pixel.

* * * * *